May 30, 1967 G. TREMOLADA 3,322,305
APPARATUS FOR DISPENSING GAS-CHARGED BEVERAGES
Filed June 21, 1965 4 Sheets-Sheet 1

INVENTOR.
GOFFREDO TREMOLADA
BY
Karl F. Ross
Attorney

May 30, 1967  G. TREMOLADA  3,322,305
APPARATUS FOR DISPENSING GAS-CHARGED BEVERAGES
Filed June 21, 1965  4 Sheets-Sheet 4

INVENTOR.
GOFFREDO TREMOLADA
BY
Karl F. Ross
Attorney

United States Patent Office 3,322,305
Patented May 30, 1967

3,322,305
APPARATUS FOR DISPENSING GAS-CHARGED BEVERAGES
Goffredo Tremolada, Via Console Marcello 10, Milan, Italy
Filed June 21, 1965, Ser. No. 465,450
Claims priority, application Italy, June 26, 1964, 14,165/64; Feb. 20, 1965, 3,580/65
20 Claims. (Cl. 222—61)

My present invention relates to an apparatus for dispensing gas-charged beverages and, more particularly, to a dispensing system adapted to be used in coin-operated devices and for over-the counter sales and controlled distribution of such beverages.

The beverage-dispensing art has, in recent years, experienced a widespread growth, especially in the fields relating to automatic dispensing and distribution of beverages and the like from coin-operated machines and from other devices designed to dispense a continuous or interrupted flow of a premixed beverage, such devices having application in fountains, bars, pubs and the like as well as in coin-operated apparatus. In general, however, systems of this type have been characterized by tubes individually supplying a syrup or flavoring, water and a charging gas (i.e. carbon dioxide) to a dispensing nozzle in which the three components are mixed together as they are discharged into cups or through a spigot for distribution to the consumer. It is a common difficulty with these devices that the gas affects the metering of the syrup and/or water so that, for example, the presence of large gas bubbles in the distribution line will reduce the amount of beverage delivered or change the proportions of its liquid components, i.e. flavoring and water. Furthermore, earlier devices of this general type were relatively complex and certainly not amenable to continuous service for long periods of time. In addition, such earlier devices were often incapable of terminating operation when the supply of one or more components was depleted so that the consumer often received his beverage without flavor or without charging by the gas, or without water.

It is the principal object of the present invention to provide an improved system for dispensing gas-charged beverages and especially beverages having at least two liquid components, such as water and a flavoring substance.

Another object of my invention is to provide a system of this character which accurately proportions the several components in exact volumetric ratios, unaffected by the presence of gas bubbles and like disturbances characterizing earlier systems.

A further object of the invention is to provide a system for the dispensing of gas-charged beverages and the proportioning thereof which is entirely fluid-operated with respect to the proportioning and mixing devices, thereby eliminating the need for complex electrical circuits, detecting devices and the like.

These objects and others which will become apparent hereinafter are attained, in accordance with the present invention, in an apparatus for making gas-charged beverages which comprises proportioning means separately metering a predetermined volume of each of the components of the mixture to be dispensed; means for mixing the liquid ingredient, namely the flavoring or syrup and the water; and charging means for thereafter passing the liquid mixture and the gas into intimate relationship to charge the liquid mixture with the gas. Thus, according to this aspect of the invention, the individual liquid ingredients are separately metered and then mixed together while the gas component, also separately metered, is added to the liquid mixture only subsequently to the mixing together of the liquid constituents to form the liquid component. More specifically, the charging of the liquid component with the gas, according to the present invention, is carried out by mixing the liquid component with the gas at a high flow velocity with an increment or change thereof so that the two-phase mixture can then be passed initially at room temperature through a succession of expansion chambers and respective constrictions intermediate these chambers whereby the two-phase mixture is repeatedly expanded and compressed to cool the mixture and effect a maximum dissolution of gas in the liquid mixture.

According to a more specific feature of the present invention, significant in maintaining uniformity of the beverage to be dispensed and in preventing disturbances of the proportioning means, I feed the three-component mixture of gas, flavoring and water, after the flow mixing described above, into a storage compartment provided with pressure-relief means for maintaining substantially constant the pressure to which the final mixture is exposed. This storage compartment ensures that the volume of gas retained by the mixture will be more or less stable. Furthermore, between this compartment and the outlet of the apparatus and, in general, between the proportioning means and the outlet of the discharging means I provide an intercepting means (e.g. a valve) operable by pressure-responsive means, exposed to the gas pressure of the system directly or via a pressure-transfer vessel, for preventing the dispensing of the beverage upon a failure of the gas supply. Moreover, I have found it desirable to provide a liquid-level-detecting means at a syrup reservoir for blocking the flow of beverage through the outlet upon the failure of the syrup supply. Advantageously, the syrup-supply means includes a container provided with the level sensing means (e.g. a float) and connected to the proportioning means while a syrup reservoir is connected with this container and is subjected to gas pressure which serves to drive the syrup from the reservoir into the container. The pressure-responsive means can then include a piston exposed to the gas head within this container so that, upon a reduction below a predetermined minimum of the gas pressure supplied to the syrup reservoir, the intercepting means is actuated to close the outlet. I have found that many of the inconveniences resulting from improperly proportioned drinks can be avoided when this container is dimensioned to retain an amount of syrup equal to that required for the dispensing operation permitted by the level-detecting means so that there is no possibility that a quantity of syrup less than that required is supplied for the last drink prior to cutoff of the outlet by the level-sensing means.

In accordance with the method aspects of the present invention, the beverage is prepared by the successive steps of mixing a flavoring with a diluting liquid, usually water; passing the liquid component thus prepared and a predetermined volume of gas in a continuous flow with successive expansion and compression to dissolve the gas in the liquid component; passing the resulting mixture through a chamber having a predetermined maximum pressure and venting this chamber whenever the pressure therewithin exceeds this level; and discharging the beverage from the chamber.

Advantageously, the proportioning means includes fluid-responsive pistons each associated with one of the components of the final mixture and displaceable in respective cylinders whose bores and/or piston strokes are calibrated in accordance with the volumetric proportions of the components to be delivered. The pistons are coupled together and are shifted, upon the liquid volume in the stabilizing container falling below a predetermined level, by fluid pressure, preferably that of the charging gas. The feeding of gas, syrup and water to the respective proportioning cylinders and the discharging of the latter is carried out, according to a more specific feature of this invention, via a slide valve advantageously flanking the proportioning pistons and having a valve member displaceable parallel thereto. The slide-valve assembly thus permits the compartments on opposite sides of each piston to be of interchangeable function with the respective fluid being supplied and discharged from the compartments alternately.

According to still another feature of the present invention, the proportioning cylinders for metering the syrup and water communicate with a common accumulator which communicates with the stabilizing container mentioned above while the gas-proportioning cylinder communicates with another accumulator. The accumulator is connected in parallel with a charging column having stacked expansion chambers with intervening constrictions. At one end of this charging column, I have found it particularly desirable to introduce the liquid component generally axially through the nozzle, the gas being supplied to a compartment of the charging column opening into the path of the liquid at the mouth of this nozzle.

The above and other objects, features and advantages of the present invention will become more readily apparent from the following description, reference being made to the accompanying drawing in which.

GENERAL DESCRIPTION

Figure 1:
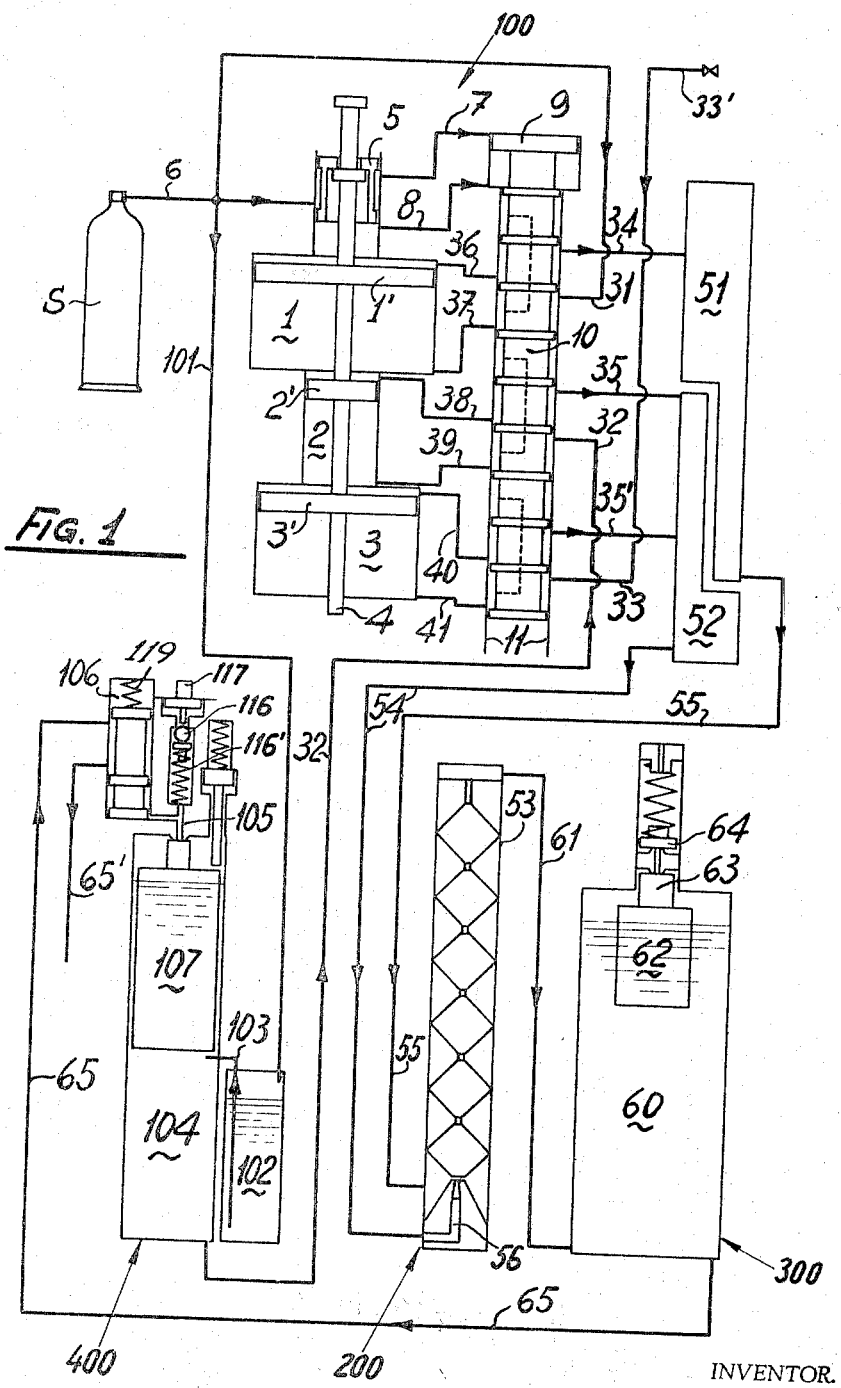
FIG. 1 is a diagram showing the various components of a beverage-dispensing system, according to my invention, with parts broken away for clarity.

The apparatus consists essentially of four units, i.e. a first unit 100 comprising the proportioning and mixing means, a second unit 200 comprising the means for charging the liquid mixture with gas, a third unit 300 for controlling and/or stabilizing the gas volume contained in the liquid mixture, and a fourth unit 400 for controlling the operation of the apparatus when the gas pressure and/or the supply of syrup fall below the required minimum.

The proportioning unit 100 (FIG. 1) is supplied with the charging gas by the replaceable or refillable supply cylinder S, while water is available from the water line 33'. The gas is fed into an accumulator 51, whereas a further accumulator 52 initially mixes the water with syrup fed by line 32 to the proportioning unit 100. The liquid mixture and gas are supplied by lines 54 and 55, respectively, to the charging unit 200. The latter is connected by a line 61 to the stabilizing unit 300 which, in turn, is connected via line 65 with the control unit 400. The beverage is dispensed at 65'. The system can be incorporated in a coin-operated vending machine provided with a cup dispenser, refrigerating device or the like in the conventional manner.

PROPORTIONING UNIT

Referring now more particularly to FIGS. 1 to 4, it will be seen that the proportioning and mixing unit 100 comprises a first proportioning or driving cylinder 1, and two proportioning cylinders 2 and 3, within which are slidably disposed the pistons 1', 2' and 3' interconnected by a rod 4 connected by a lost-motion linkage with a slide valve 5 on the upper end thereof. The slide valve 5 is connected, through pipe 6, to the source S of a suitable gas—such as $CO_2$—and is adapted to actuate, through ducts 7 and 8, the piston 9 of the slide-valve assembly 10.

Figure 2:
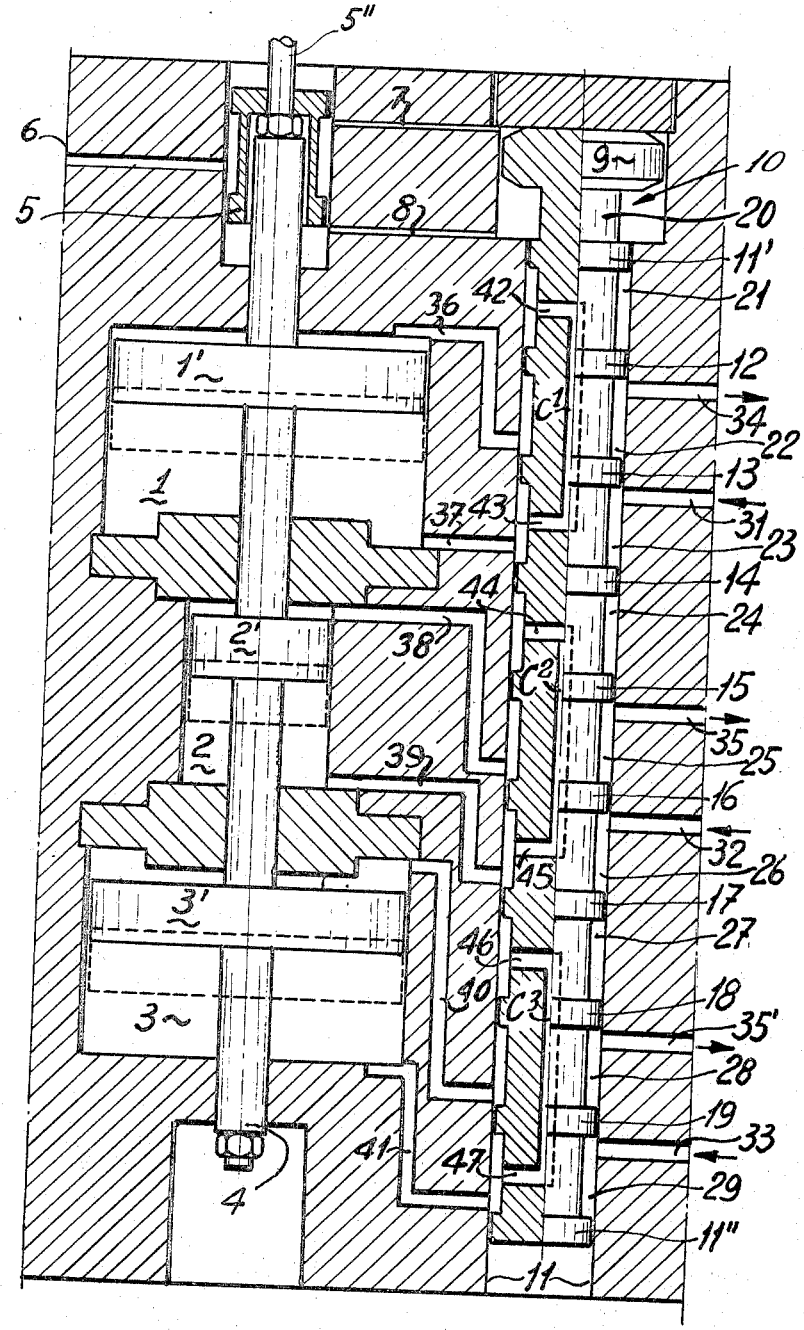
FIG. 2 is an enlarged axial cross-sectional view, partly in elevation, of a slide-valve assembly and a three-component proportioning means according to the invention.
Figure 3:
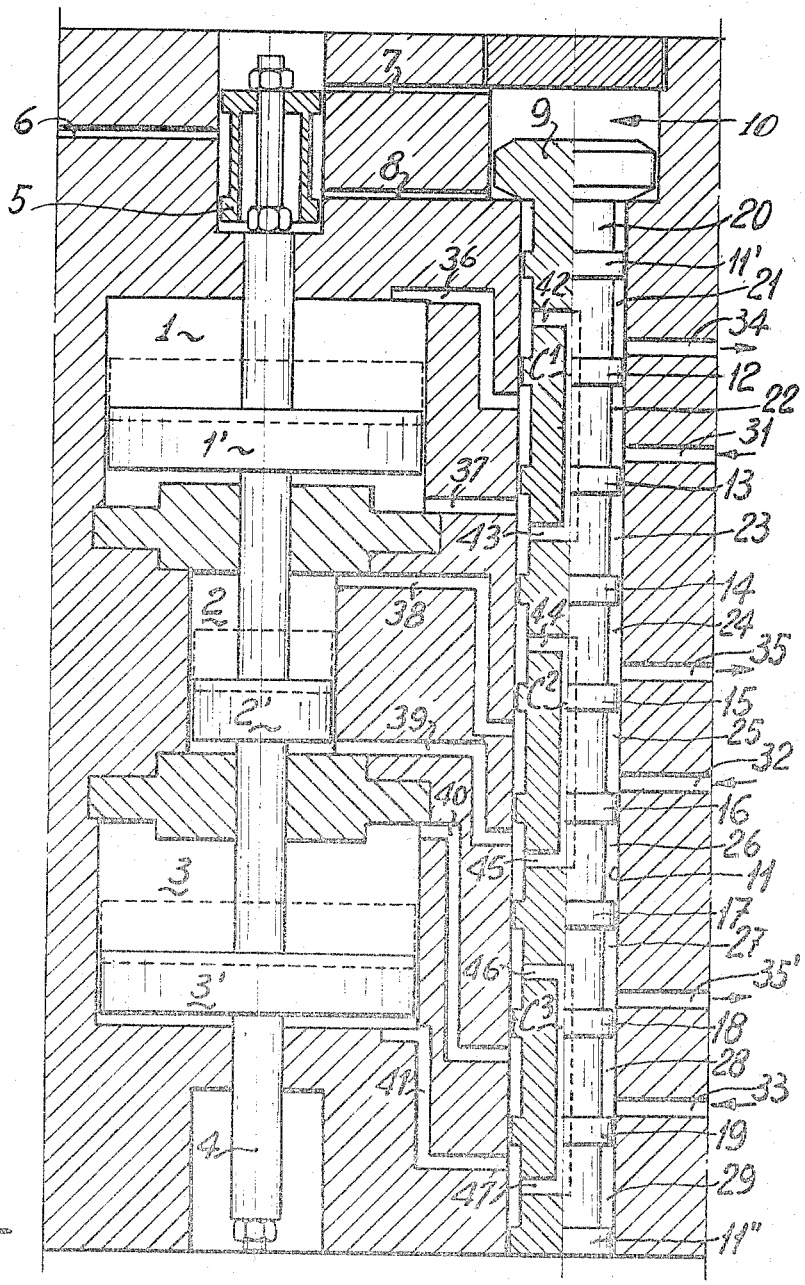
FIG. 3 is a view similar to that of FIG. 2 with the proportioning pistons and slide valve in another operative position.

As particularly shown in FIGS. 2 and 3, the slide-valve assembly 10 substantially comprises a tubular element 11 within which are slidably disposed the pistons 11', 12, 13, 14, 15, 16, 17, 18, 19 and 11'' formed on a common rod 20 secured to the piston 9. The pistons are spaced apart to define small and generally identical chambers 21, 22, 23, 24, 25, 26, 27, 28 and 29 for the passage of the gas and the other ingredients necessary for the preparation of the beverage. Inlet pipes 31 (branched from pipe 6), 32 and 33 and outlet pipes 34, 35 and 35', for the feeding and discharge respectively of the gas, syrup and water, communicate with the tubular element 11. Further ducts 36, 38 and 40 connect said tubular element 11 to the upper chambers respectively of cylinders 1, 2 and 3 and other ducts 37, 39 and 41 connect the tubular valve body to the lower chambers of said cylinder.

Rod 20 is provided with a first internal conduit $C^1$ connecting, through openings 42 and 43, the chambers 21 and 23, with a second internal conduit $C^2$ connecting, through openings 44 and 45, the chambers 24 and 26, and with a third internal conduit $C^3$ connecting, through openings 46 and 47, the chambers 27 and 29. The outlet pipe 34 for the gas communicates with the accumulator 51 while the outlet pipes 35 and 35' for the syrup and water are connected to the common container 52.

CHARGING UNIT

The means 200 for gas-charging the liquid mixture (see particularly FIG. 4) comprises a tubular housing 53 in the lower part of which is mounted a nozzle 56 connected to the pipe 54 supplied with liquid from the container 52. To the chamber 56' surrounding the nozzle 56 is connected a pipe 55 originating at the gas accumulator 51. The upper part of the tubular housing 53 is provided with a chamber 57 whose inside walls 58 are inclined to form a plurality of small expansion chambers 58' interconnected by narrow constricted passages 59; the lower narrow passage 59' of the lowermost chamber 58' is disposed along the axis of the nozzle 56 and is very close to the latter.

GAS-VOLUME STABILIZER

The device 300 for controlling the gas volume (see FIG. 1) contained in the mixture comprises a reservoir 60, connected to the charging means 53 by a pipe 61, which contains a float 62 adapted to close, in an elevated position, a discharge valve 63 connected to the atmosphere through a suitably calibrated valve 64.

CONTROL UNIT

The device 400 for controlling the operation of the apparatus when there is a failure in the gas and/or syrup supply is shown in particular in FIGS. 1, 5, 6, 7.

As is clear from FIG. 1, from the pipe 6 connecting the slide valve 5 to the source S of the gas is branched a pipe 101 for feeding the gas under pressure to a syrup-supply tank or reservoir 102. To the supply tank 102 is connected a pipe 103 for feeding syrup under pressure to the syrup accumulator or container 104 connected, via pipe 105, to an intercepting valve 106 in the delivery line 65, 65' and, via pipe 32, to the slide-valve assembly 10 for feeding, through ducts 38 or 39, the syrup to the proportioning cylinder 2.

The syrup accumulator 104 is provided (FIGS. 5–7) with a float 107 having integral therewith a stem 108, on the upper part of which a disk valve 109 is mounted for blocking an outlet port 110 upon elevation of float 107. On the upper part of accumulator 104 a bore 110' is provided for directly connecting this upper part to a cylinder 111 within which a spring 113 is slidably disposed; a piston 112 having an integral stem 114 extends through said bore 110' into the accumulator 104. The length of stem 114 is so dimensioned as to push the float 107 downwardly, upon the expansion of spring 113, in order to open the outlet port 110.

The outlet port 110 is connected to a chamber 115; the latter communicates with the atmosphere via a ball valve 116 operated by a spring 116′ and a pushbutton 117.

Within the intercepting valve 106 of the delivery line, 65, 65′, a piston 118 is slidably disposed and, in the lowered position (FIG. 5), connects the two portions 65, 65′ of the outlet; when in the raised position (FIGS 6 and 7), the valve piston 118 blocks the pipe 65. A suitable spring or weight 119 (FIGS. 1 and 5) is provided for yieldably retaining the piston 118 in the lowered position. A passage 105, connecting said valve 106 to the chamber 115, communicates with a small chamber 120 provided in the lower part of valve 106.

OPERATION

I. *Preparative mode*

Figure 5:
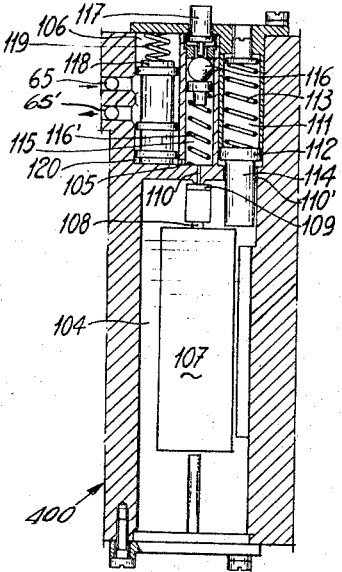
FIGS. 5-7 are similar axial cross-sectional views through a syrup-dispensing device provided with intercepting means for blocking discharge of the beverage upon failure of the syrup and/or gas supply.
Figure 6:
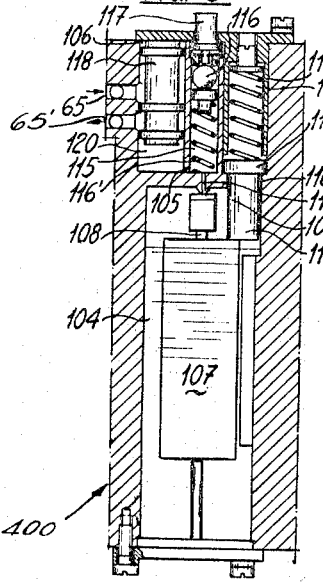
Figure 7:
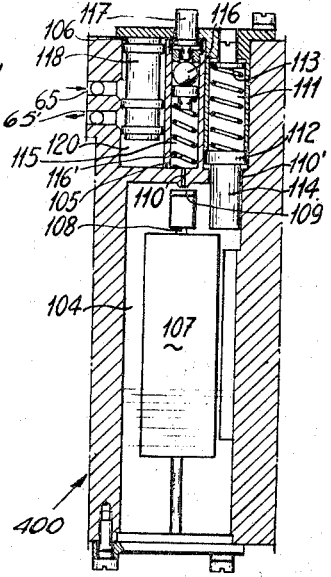

To allow the initial feeding of the accumulator 104 with syrup under pressure fed, through pipe 103, from the supply tank 102, the pushbutton 117 (FIGS. 1, 5, 6 and 7) is actuated to open, against the counter-action of spring 116′, the ball valve 116 and to connect, through outlet port 110 and chamber 115, the inside of accumulator 104 to the atmosphere. The pressure built up within accumulator 104 for the displacement of the syrup acts, through opening 110′, against the lower surface of the piston 112 and displaces the latter within cylinder 111, thereby compressing the spring 113 (FIG. 5). The float 107 rises by virtue of, the elevation of the level of the syrup within the accumulator 104 and blocks, via disk valve 109, the outlet port 110. The spring 113, of course, is dimensioned to yield when the pressure of the system is higher than a predetermined value and to expand when said pressure is lower than said value.

The actuating of the pushbutton 117, besides allowing the initial filling if the accumulator 104 with syrup, also connects the chamber 120 to the atmosphere, through passage 105 and chamber 115, thus allowing the discharge of any gas possibly contained in chamber 120 and consequent lowering, by the action of a spring 119 or its own weight, of piston 118 to connect the two portions of the delivery pipe 65, 65′ (FIGS. 1 and 5). The apparatus is now ready for operation.

II. *Operative mode*

Assume the slide-valve assembly 10 to be in the raised position shown in FIG. 2, the pistons 1′, 2′, 3′ to be in the intermediate position shown in broken lines in FIG. 2, and the reservoir 60 (FIG. 1) to be filled with a previously mixed beverage. In this condition, the pressure within reservoir 60, where the valve 63 has been closed by the float 62, balances the feeding-gas pressure which, through pipe 31, chamber 23 and pipe 37, acts on the lower part of the piston 1′; the system, being balanced, will remain stationary and there will be no upward displacement of piston 1′.

As soon as a quantity of beverage is discharged, through pipe 65, 65′, from reservoir 60, the pressure in this reservoir drops and the pressure differential thus produced allows the gas to push upwardly the piston 1′. Accordingly, the rod 4 will urge upwardly also the pistons 2′ and 3′.

*Cylinder 1.*—Gas is supplied from tank S and line 6 through pipe 31, chamber 23 and duct 37 to this cylinder; gas discharge (of the gas previously retained in the upper chamber of the cylinder is effected through duct 36, chamber 22 and pipe 34, the gas being fed to the accumulator 51.

*Cylinder 2.*—Syrup is supplied from reservoir 104 through pipe 32, valve chamber 26 and duct 39; syrup (previously supplied to the upper chamber of the cylinder) is discharged through duct 38, chamber 25 and pipe 35 into the container 52.

*Cylinder 3.*—Water is supplied from the water line 33′ through pipe 33, valve chamber 29 and duct 41; water (previously supplied to the upper chamber of this cylinder) is discharged through duct 40, chamber 28 and pipe 35′ into the container 52 where it is mixed with the syrup therein fed through pipe 35.

When the pistons 1′, 2′ and 3′ reach the upper ends of their collective stroke (solid lines in FIG. 2), the slide valve 5 connects the gas-feeding conduit 6 to the conduit 7; the gas thereby actuates the piston 9 to displace it from the position shown in FIG. 2 to the position illustrated in FIG. 3. Such displacement of piston 9 causes a corresponding downward displacement of the valve member 20 and consequently of the several pistons of the slide-valve assembly 10. In FIG. 3 the pistons 1′, 2′, 3′ are shown in broken lines when in an intermediate position of their downward stroke and in full lines when in a position corresponding to the lower end of stroke.

In the subsequent cycle there is a directional reversal of the inlet and outlet pipes of the three cylinders.

*Cylinder 1.*—Gas is supplied from line 6 through pipe 31, chamber 22 and duct 36; gas (fed into the lower chamber of the cylinder in the previous cycle) is discharged through duct 37, chamber 23, internal conduit $C^1$, chamber 21 and pipe 34 to the accumulator.

*Cylinder 2.*—Syrup is supplied through pipe 32, chamber 25 and duct 38; syrup (previously fed into the lower chamber of the cylinder) is discharged through duct 39, chamber 26, internal conduit $C^2$, chamber 24 and pipe 35 to container 52.

*Cylinder 3.*—Water is supplied through pipe 33, chamber 28 and duct 40; water (fed into the lower part of the cylinder during the previous cycle) is discharged through duct 41, chamber 29, internal conduit $C^3$, chamber 27 and pipe 35′ to the container 52, wherein it is mixed with the syrup from pipe 35.

The continuous delivery of beverage from reservoir 60 will cause a constant repetition of the above cycles.

Figure 4:
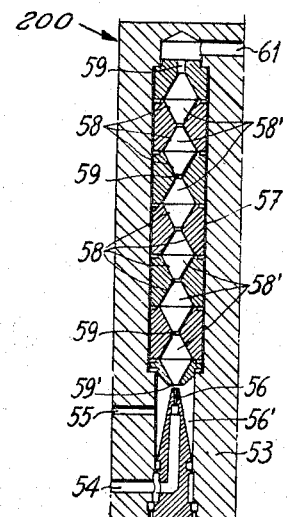
FIG. 4 is an enlarged axial cross-sectional view through a flow-charging device according to this invention.

The water-syrup mixture collected in the container 52 is fed into the beverage-charging device 53 through pipe 54 and nozzle 56 (FIGS. 1 and 4). At the mouth of the nozzle 56, the syrup-water mixture is mixed in the chamber 56′ with the gas arriving at pipe 55 and the resulting blend is conveyed at a high velocity into the tubular turbulent-flow chamber 57. Owing to the presence of the successive chambers 58′ and narrow passages 59′ and 59 (i.e. constrictions between the passages), the mixture undergoes a number of alternate expansions and compressions, this causing a sensible cooling of the mixture and a maximum absorption of gas into the liquid component of the mixture. The gas-charged mixture is then fed, through pipe 61, to reservoir 60 and delivered through pipe 65 to the consumer.

If the pressure of the reservoir 60 should attain, during the delivery of the beverage, values higher than the predetermined relief pressure of the valve 64, the latter will open to discharge into the atmosphere the excess gas, thus restoring the optimum pressure in the reservoir.

Upon an interruption of the delivery, the apparatus will continue to operate and to supply the beverage to the reservoir 60 until the float 62 closes the valve 63, allowing the pressure within the reservoir 60 to balance the pressure of the feeding gas and consequently to interrupt the operation of the system.

If, during the operation, there is a failure in the feeding of the syrup (FIG. 7), there will be a lowering of the float 107, thereby opening outlet port 110 and establishing communication between the interior of syrup accumulator 104 and chamber 120. Because of pressure of the gas present in accumulator 104, the piston 118 lifts against the action of the spring 119, the latter being calibrated to a predetermined minimum value of the pressure, and consequently blocks the pipe 65.

If, on the contrary, the pressure in accumulator 104 (FIG. 6) drops below a predetermined value, the gas spring 113 pushes down the piston 112, which in turn bears with its stem 114 against the float 107 to lower the latter, thus connecting, through outlet port 110, the accumualtor 104 to the chamber 120. By virtue of the residual pressure of the gas contained in accumulator 104, there is an upward displacement of piston 118 against the action of spring 119.

The blocking of pipe 65, therefore, will interrupt the delivery of the beverage but the apparatus will continue to operate for a short time until the reservoir 60 is filled up. The filling of reservoir 60, by the closing of the valve 63, will balance the pressures. In order to avoid, during this short period of time, the feeding of improperly proportioned beverage to the reservoir 60, the syrup accumulator 104 is dimensioned to allow, as soon as the supply tank 102 is empty, the supply of a quantity of syrup sufficient to complete the cycle.

Although a certain particular embodiment of the invention is herein disclosed for purposes of explanation, further modifications thereof, after study of this specification, will be apparent to those skilled in the art to which the invention pertains.

I claim:

1. An apparatus for dispensing a gas-charged beverage, comprising a source of a first liquid ingredient of said beverage, a source of a second liquid ingredient of said beverage, and a source of a charging gas; proportioning means connected with said sources for separately metering predetermined quantities of said charging gas and each of said liquid ingredients; mixing means connected with said proportioning means for combining said liquid ingredients to form a liquid component; charging means for passing said liquid component and the metered predetermined quantity of gas into intimate mixing relationship at an elevated velocity to dissolve said gas in said liquid component; discharging means connected with said charging means for delivering the gas-charged mixture; and stabilizing means connected between said mixing means and said discharging means for rendering substantially uniform the gas content of the gas-charged mixture supplied by said mixing means to said discharging means, said stabilizing means including a temporary-storage container provided with a first valve responsive to the level of the mixture within said container and a second valve responsive to gas pressure within said container, said first and second valves venting said container to the atmosphere upon the liquid level falling below a predetermined value and the gas pressure exceeding said predetermined level, said proportioning means being actuatable upon the venting of said container to the atmosphere with a decrease in the liquid level therein below said predetermined value.

2. An apparatus for dispensing a gas-charged beverage, comprising a source of a first liquid ingredient of said beverage, a source of a second liquid ingredient of said beverage, and a source of a charging gas; proportioning means connected with said sources for separately metering predetermined quantities of said charging gas and each of said liquid ingredients; mixing means connected with said proportioning means for combining said liquid ingredients to form a liquid component; charging means for passing said liquid component and the metered predetermined quantity of gas into intimate mixing relationship at an elevated velocity to dissolve said gas in said liquid component; and discharging means connected with said charging means for delivering the gas-charged mixture; said proportioning means including a pair of proportioning cylinders respectively connected with said sources of said first and second liquid ingredients, double-acting piston means reciprocable in said cylinder for discharging predetermined quantities of said liquid ingredients upon each forward stroke and reverse stroke of said piston means, and a gas-driven piston connected with said source of charging gas and operatively connected with said double-acting piston means for displacing same to proportion said liquid ingredients.

3. An apparatus as defined in claim 2 wherein said proportioning means further comprises distributing-valve means connected with said cylinders and said sources for alternately feeding said liquid ingredients to opposite sides of the respective double-acting piston means, and fluid-responsive means controlled by said piston for operating said distributing-valve means.

4. An apparatus for dispensing a gas-charged beverage, comprising a source of a first liquid ingredient of said beverage, a source of a second liquid ingredient of said beverage, and a source of a charging gas; proportioning means connected with said sources for separately metering predetermined quantities of said charging gas and each of said liquid ingredients; mixing means connected with said proportioning means for combining said liquid ingredients to form a liquid component; charging means for passing said liquid component and the metered predetermined quantity of gas into intimate mixing relationship at an elevated velocity to dissolve said gas in said liquid component; discharging means connected with said charging mean for delivering the gas-charged mixture; said mixing means including a liquid accumulator receiving said predetermined quantities of both said liquid ingredients; further comprising a gas accumulator connected with said proportioning means for receiving said predetermined quantity of charging gas, both said accumulators being connected in parallel with said charging means.

5. An apparatus for dispensing a gas-charged beverage, comprising a source of charging gas; a syrup reservoir, a syrup-dispensing chamber connected with said reservoir, and conduit means connected with said source of charging gas and said reservoir for supplying said gas under pressure to the latter to drive syrup from said reservoir into said chamber; mixing means connected to said source, said chamber and a water supply for producing said beverage, said mixing means being provided with discharging means for said beverage; and control means for discontinuing the dispensing of fluid from said discharging means upon insufficiency of supply of an ingredient of said beverage, said control means comprising liquid-level-detecting means in said chamber responsive to the syrup level therein for indicating failure of the syrup supply, fluid-pressure-responsive means connected with said chamber for detecting a fall of gas pressure below a predetermined level, and intercepting-valve means in said discharging means operable by said liquid-level-detecting means and said fluid-pressure-responsive means.

6. An apparatus as defined in claim 5 wherein said chamber is provided with manually operable valve means for venting it to the atmosphere to permit the feeding of syrup into said chamber from said reservoir, said proportioning means including fluid-responsive driving means connected with said chamber and actuatable upon operation of the manually operable valve means to initiate metering of additional quantities of said gas and said liquid ingredients.

7. An apparatus as defined in claim 5 wherein said container is dimensioned to contain a quantity of syrup sufficient prior to operation of said liquid-level-detecting means to permit the delivery of completely flavored beverage prior to termination of delivery even upon emptying of said reservoir.

8. An apparatus as defined in claim 5 wherein said valve means comprises a fluid-pressure-responsive valve member biased into a position permitting operation of said discharging means but shiftable upon opeartion of said liquid-level-detecting means into a delivery-blocking position.

9. An apparatus as defined in claim 8 wherein said valve means includes a cylinder, said valve member forming a piston in said cylinder, said chamber being provided with a passage communicating with said cylinder for applying gas pressure to said valve member, said liquid-leveldetecting means including float means locking said passage upon said chamber containing a supply of syrup sufficient to produce the beverage.

10. An apparatus as defined in claim 9 wherein said fluid-pressure-responsive means includes a plunger engageable with said float means for unblocking said passage upon a fall in the pressure within said chamber.

11. An apparatus as defined in claim 18 wherein said mixing means includes an elongated charging column provided with a plurality of expansion chambers spaced apart therealong, and means forming constricted passages between said chambers, said liquid component and gas being introduced at one end of said succession of chambers and being passed therethrough with alternate expansion and compression to dissolve said gas in said liquid component while cooling the latter.

12. An apparatus as defined in claim 11 wherein said charging column is provided with a nozzle aligned with said passages for directing a stream of said liquid component therethrough with a change in flow velocity of said liquid component, and means for admixing said gas with the stream of said liquid component injected from said nozzle substantially at the mouth thereof.

13. An apparatus for dispensing a gas-charged beverage, comprising a source of a first liquid ingredient of said beverage, a source of a second liquid ingredient of said beverage, and a source of a charging gas; proportioning means connected with said sources for separately metering predetermined quantities of said charging gas and each of said liquid ingredients; mixing means connected with said proportioning means for combining said liquid ingredients to form a liquid component; charging means for passing said liquid component and the metered predetermined quantity of gas into intimate mixing relationship at an elevated velocity to dissolve said gas in said liquid component; discharging means connected with said charging means for delivering the gas-charged mixture; said proportioning means including a housing, a plurality of proportioning piston-and-cylinder arrangements with interconnected pistons reciprocable in said housing for metering said quantities, and slide-valve means reciprocable in said housing for directing flow of gas and said liquid ingredients to the respective piston-and-cylinder arrangements.

14. An apparatus for dispensing a gas-charged beverage, comprising a source of gas under pressure, a supply for liquid to be charged with said gas, mixing means connected with said source and said supply, said mixing means being provided with conduit means for the discharge of the resulting mixture, blocking means for interrupting the discharge of mixture through said conduit means, and control means for operating said blocking means upon a deficiency of an ingredient of said mixture; said control means including a chamber communicating with said supply and said source, a first sensing device responsive to the level of said liquid in said chamber, a second sensing device responsive to the pressure of said gas in said chamber, and operating means for said blocking means actuatable by either of said devices upon a respective dropping of said level or said pressure below a predetermined value.

15. An apparatus as defined in claim 14 wherein said first sensing device comprises a float, said second sensing device comprising a downwardly biased member bearing upon said float in a normal position of the latter, said operating means being coupled with said float for displacement thereby upon a lowering of said float from said normal position.

16. An apparatus as defined in claim 15 wherein said blocking means comprises a pneumatic valve normally biased into an unblocking position, said operating means normally obstructing a passage from said chamber to said valve but being withdrawable from said passage by the descending float for admitting residual gas pressure from said chamber to said valve, thereby moving the latter into a blocking position, said blocking means being provided with venting means for restoring said valve to normal.

17. An apparatus as defined in claim 14 wherein said supply includes a reservoir for said liquid having an overflow connection to said chamber and a pipe for delivering gas from said source to the top of said reservoir whereby the liquid therein is driven by gas pressure through said overflow connection into said chamber.

18. An apparatus for dispensing a gas-charged beverage, comprising a source of a liquid component of said beverage; a source of charging gas; proportioning means connected with said sources for separately metering predetermined quantities of said charging gas and said liquid component; mixing means connected with said proportioning means for introducing said gas into said liquid component; and discharging means connected with said mixing means for dispensing the resulting mixture; said charging means including a receptacle in said discharging means for storing a quantity of said mixture under pressure of the evolving gas, and delivery means differentially connected to said source of charging gas and to said container for operation upon the pressure of said charging gas exceeding the fluid pressure of said container.

19. An apparatus as defined in claim 18 wherein said delivery means comprises a reciprocable piston assembly with a first cylinder for the delivery of said gas and a second cylinder for the delivery of the liquid component, said assembly being provided with valve means for periodically reversing the displacement thereof due to the pressure differential between said charging gas and said container.

20. An apparatus as defined in claim 18 wherein said container is provided with pressure-relief means for discharging gas from said container upon the pressure therein exceeding a predetermined level.

References Cited
UNITED STATES PATENTS

| | | |
|---|---|---|
| 1,600,951 | 9/1926 | Scott et al. |
| 2,141,638 | 12/1938 | Bean _____ 222—66 |
| 2,229,441 | 1/1941 | Carlson _____ 261—75 |
| 2,427,429 | 9/1947 | Waite et al. _____ 222—129.3 |
| 2,548,241 | 4/1951 | Reynolds et al. _____ 222—64 X |
| 2,566,436 | 9/1951 | Waite _____ 222—334 X |
| 2,675,946 | 4/1954 | Strempel _____ 222—137 |
| 2,736,466 | 2/1956 | Rodth _____ 222—129.2 X |
| 3,149,756 | 9/1964 | Carpigiani _____ 222—137 X |
| 3,206,069 | 9/1965 | Jacobs et al. _____ 222—1 |

RAPHAEL M. LUPO, *Primary Examiner.*